United States Patent
Ezendam et al.

(10) Patent No.: US 7,814,738 B2
(45) Date of Patent: Oct. 19, 2010

(54) DEVICE AND METHOD FOR CULTIVATING A CROP, AND ALSO ASSEMBLY OF A DEVICE OF THIS TYPE AND A CROP

(75) Inventors: Jan Pontianus Ezendam, Borne (NL); Nicodemus Assisius Ezendam, Hertme (NL)

(73) Assignee: Vastgoedmaatschappij Gebr. Ezendam B.V., Borne (NL)

( * ) Notice: Subject to any disclaimer, the term of this patent is extended or adjusted under 35 U.S.C. 154(b) by 0 days.

(21) Appl. No.: 11/904,303

(22) Filed: Sep. 26, 2007

(65) Prior Publication Data
US 2008/0078088 A1    Apr. 3, 2008

(30) Foreign Application Priority Data
Sep. 28, 2006    (NL) .................................... 2000250

(51) Int. Cl.
*A01G 3/00*    (2006.01)
(52) U.S. Cl. .................... 56/234; 172/13; 47/4; 30/379
(58) Field of Classification Search .................. 30/379, 30/299, 379.5; 56/1, 230–236, 255, 295, 56/15.2; 83/928; 47/4; 172/13–18, 25, 378, 172/373, 374
See application file for complete search history.

(56) References Cited

U.S. PATENT DOCUMENTS

| | | | | | |
|---|---|---|---|---|---|
| 2,888,084 | A | * | 5/1959 | Trecker | 172/41 |
| 4,293,041 | A | * | 10/1981 | Holmstadt et al. | 172/39 |
| 4,382,332 | A | * | 5/1983 | Dominge | 30/379 |
| 4,862,682 | A | * | 9/1989 | Wait et al. | 56/255 |
| 5,461,788 | A | * | 10/1995 | Taylor | 30/300 |
| 5,493,783 | A | * | 2/1996 | Oostendorp | 30/276 |
| 5,938,290 | A | * | 8/1999 | Mikeska | 30/300 |
| 6,151,876 | A | * | 11/2000 | Van Der Burg | 56/234 |
| 6,810,967 | B1 | * | 11/2004 | Phillips | 172/13 |
| 6,854,524 | B1 | | 2/2005 | Williams | |

FOREIGN PATENT DOCUMENTS

DE    4409126    6/1995

* cited by examiner

*Primary Examiner*—Robert E Pezzuto
(74) *Attorney, Agent, or Firm*—The Webb Law Firm

(57) ABSTRACT

A device for cultivating a crop, such as a tree or plant, includes a rotary body which is rotatable about an axis of rotation. At least one cutting member is provided, which is fastened to the rotary body in such a way that the cutting member, during the rotation of the rotary body, defines a substantially circular path. The cutting member is configured in such a way that a crop located radially within the path can be cultivated along said the path.

19 Claims, 3 Drawing Sheets

DEVICE AND METHOD FOR CULTIVATING A CROP, AND ALSO ASSEMBLY OF A DEVICE OF THIS TYPE AND A CROP

BACKGROUND OF THE INVENTION

1. Field of the Invention

The invention relates to a device for cultivating a crop, such as a tree or plant. In particular, the invention relates to a device for modelling a portion of a tree nursery crop, such as a box tree or an olive tree, received in a pot or in the soil.

2. Description of the Related Art

For pruning a crop, various principles may be distinguished. In the case of the shearing of crops, such as twigs or leaves, the cutting edges of a pair of blades are moved along each other so as to shear through a crop located therebetween. In shearing, one blade forms a counter-blade along which the other blade performs a cutting movement. The counter-blade is usually fixed. In the case of the chopping of crops, a blade moves against a crop at such a high speed, without the use of a counter-blade, that said crop is chopped through. In chopping, the blade which moves relatively quickly does not cooperate with a counter-blade.

A device for cultivating a box tree is known from DE 44 09 126. In order to form a spherical crown on this tree, hedge shears are moved along a circular guide rail. The blades of the shears extend in this case tangentially in relation to the desired spherical crown. However, it is inconvenient to keep the blades of the shears fixed in relation to each other throughout the service life of the hedge shears. The moisture originating from twigs and leaves which have been chopped through and the twigs themselves push the blades of the shears apart. This device comprising hedge shears is therefore prone to wear. In addition, cultivating the box tree using this device is time-consuming, while the appearance of the cultivated crown can differ somewhat from the desired spherical shape.

SUMMARY OF THE INVENTION

An object of the invention is to provide an improved device for cultivating a crop that, for example, has a longer service life and/or allows more rapid cultivation of the crop.

According to the invention, this object is achieved in that the device comprises a rotary body which is rotatable about an axis of rotation, and also at least one cutting member which is fastened to the rotary body in such a way that the cutting member, during the rotation of the rotary body, defines a substantially circular path, the cutting member being configured in such a way that a crop located radially within the path can be chopped along said path by the cutting member. The cutting member is formed, for example, by a cutter blade extending substantially parallel to the axis of rotation. According to the invention, the cutting member is suitable for chopping through portions of the crop protruding from the interior of the circular path in relation to said path. The rotation of the rotary body allows the chopping to be carried out rapidly. Furthermore, the configuration according to the invention results in hardly any wear.

A further advantage is that the crop cultivated in accordance with the invention has an appearance which is closer to the desired form than in the case of cultivating the crop using hedge shears. According to the invention, the appearance of the cultivated crop is tauter and smoother.

It should be noted that a device is known for the mowing of grass wherein the cutting members are able to rotate about an axis of rotation in a circular path. However, in this case, the cutting members are able to cultivate merely the grass located outside said path. These cutting members are not suitable for cultivating a crop located radially within the path of the cutting members.

It should also be noted that a device for the shearing of twigs from a plant is known from U.S. Pat. No. 6,854,524. This device comprises an inner and outer cutter blade assembly. The inner cutter blade assembly is provided with inner, fixed blades which are attached around the plant. The inner, fixed blades are inserted into the soil. The outer cutter blade assembly moves downward over the inner cutter blade assembly. The outer cutter blade assembly has outer blades which are rotatable about a centre axis. The outer blades move along the inner, fixed blades, so protruding twigs are sheared off.

The principle for cutting back the protruding twigs is shearing and not chopping, i.e. this device comprises counter-blades. The outer blades rotate at a speed ensuring the shearing action of the blades. This speed is lower than the speed of rotation during the chopping of twigs. As a result, cultivating the plant using this device is relatively slow.

The entrainment of twigs is a further drawback in the use of a fixed counter-blade. As a result of the relatively low speed, protruding twigs of the plant can bend in conjunction with the rotating blades until they reach the fixed counter-blades. The sheared-off twigs are therefore not of uniform length. This leads to a less taut appearance of the plant. There is also a considerable risk that protruding twigs will not be sheared through but rather bent around the inner, fixed counter-blade. This is especially true for thick twigs which tend to snap inward around the inner, fixed counter-blade. This may even cause said blade to bend inward.

In addition, it is possible that twigs of the plant will also bend as a result of the downward movement of the outer cutter blade assembly. If said twigs are pressed flat against the soil, they are not sheared off at all.

According to the invention, it is possible that the device is not provided with a fixed counter-blade cooperating with the cutting member. The device according to the invention is configured for rotating the rotary body at such a high speed that the crop is chopped through by the cutting member without the use of a counter-blade. In other words, the cutting members according to the invention are suitable for pruning crops without the use of a counter-blade. The rotary body and the cutting members fastened thereto are rotated at a sufficiently high speed to chop through the twigs or leaves of the crop.

The rotary body is, for example, rotatable at a rotational speed such that the tangential speed of the cutting member or the cutting members is greater than approximately 40 m/s, preferably greater than 50 m/s or 60 m/s. The rotational speed of the rotary body is dependent on the diameter of the circular path of the cutting members. If the cutting member moves too slowly, there is a risk that protruding twigs and leaves will not be chopped off but rather entrained by a revolving cutting member. An entrained twig then bends until said twig snaps off after the cutting member as it moves away.

According to the invention, it is possible that a plurality of cutting members are provided, each fastened to the rotary body in such a way that each cutting member passes through the circular path during the rotation of the rotary body, and wherein the cutting members are set apart from one another. The cutting members are each suitable for chopping crops, i.e. there are no counter-blades.

In a preferred embodiment, the or each cutting member is provided with a cutting edge, a radial inner surface and a radial outer surface, which surfaces intersect to form the cutting edge, and wherein at least one of said surfaces extends radially inward toward the cutting edge. The cutting edge is formed by the front edge of the cutting member during the rotation of the rotary body. Two surfaces of the cutting member extend at an angle in relation to each other from the cutting edge. Preferably, both surfaces of the cutting member are provided somewhat radially inwardly toward the cutting edge, i.e. both surfaces extend at a slight angle in relation to the tangential of the circular path of the cutting members. The cutting face of the cutting member is therefore turned obliquely inward—the cutting face extends substantially radially inward in the direction of rotation. As a result, this embodiment of the cutting member is especially suitable for the cutting or pruning of twigs and leaves of a tree or plant located within the circular path, which twigs and leaves protrude radially in relation to said path.

Moreover, according to the invention, it is possible that merely one of the surfaces of the cutting member extends radially inward. For example, the radially inner surface extends substantially tangentially in relation to the circular path, whereas the radially outer surface extends somewhat radially inward toward the cutting edge. According to the invention, the cutting face, defined by the cutting member, can even extend substantially tangentially in relation to the circular path. A cutting member of this type can also prune off twigs and leaves protruding from the interior of the rotary body in relation to the circular path.

According to the invention, the or each cutting member can, in combination with a cutting face extending radially inward or tangentially, be delimited in the axial direction of the rotary body by an end edge which is provided at such an angle in relation to the orbital plane through the circular path that the end edge and the cutting edge merge in a pointing. The end edge of the cutting member extends obliquely in relation to the orbital plane defined by the circular path of the cutting member or the cutting members. The end edge, i.e. the lower edge of the cutting member that faces the plant or tree, recedes obliquely from the front cutting edge. In other words, the end edge extends obliquely away from the circular path in the direction of rotation, i.e. from the rear edge to the front edge of the cutting member. The end edge and the cutting edge of the cutting member therefore merge in a point. If the cutting edge of the cutting member prunes off a twig as a result of its revolving, the pruned-off twig immediately has free space after said point. The twig is cut off from the point along the cutting edge. This is beneficial for the results of the pruning.

In an embodiment of the invention, the rotary body comprises a holder having at an open end a circumferential edge, the cutting member or the cutting members being attached to the circumferential edge. The holder can be provided with recesses formed from the circumferential edge between the cutting members. As the cutting members revolve, twigs and leaves are chopped off from the crop which are cast outward as a result of the centrifugal force. The recesses are intended to allow a substantial portion of said cut-off crop to pass outward. The holder thus becomes clogged less quickly.

According to the invention, it is preferred that a turntable is provided for receiving the crop to be cut, the turntable being rotatable about a rotary axis extending at an angle in relation to the axis of rotation of the rotary body or the cutting members. The rotary axis of the turntable is usually substantially vertical. The crop to be cut rests on the turntable so as to be able to rotate about the vertical rotary axis. The rotary body comprising the cutting members is mounted above the turntable. The crop, especially the crown of a tree or plant, protrudes in this case partially into the rotary body. During operation, the rotary body and the turntable rotate with the crop resting thereon. This provides the crop with a spherical shape which is desirable, for example, for box trees.

For achieving a spherical shape, the crop can in fact be fixed, for example in the soil itself, whereas the rotary body is not only rotatable about the axis of rotation but also can be swivelled about a substantially vertical swivel axis. For this purpose, the rotary body is, for example, suspended in a circular guide rail above the crop.

It is in this case beneficial if the rotary axis of the turntable or the swivel axis of the rotary body crosses the axis of rotation of the cutting members, i.e. said axes do not intersect. The axis of rotation of the cutting members is set apart from the substantially vertical rotary axis of the turntable or swivel axis of the rotary body. During operation, the portion of the crop that is to be cultivated is located eccentrically in relation to the circular path of the cutting members. The crop rests against said path merely along a cultivation portion of the circumference, so the crop is cultivated by the cutting members merely at this location. Outside, the cutting members are able to rotate about the crop, thus allowing the cultivation to be performed locally and precisely.

In addition, the rotary body can be tiltable about a tilt axis extending substantially perpendicularly in relation to the axis of rotation of the rotary body. The tilt axis preferably also extends substantially perpendicularly in relation to the rotary axis of the turntable.

It is possible in this case that a drive motor with a drive shaft is provided, and wherein the rotary body can be driven by a rotary shaft defining the axis of rotation thereof, and wherein the drive shaft of the motor is connected to the rotary shaft of the rotary body via a transmission which increases the rotational speed of the rotary shaft of the rotary body in relation to the rotational speed of the drive shaft of the motor. This transmission therefore increases the rotational speed of the revolving cutting members. If the outgoing rotational speed of the drive motor is limited, the revolving cutting members can nevertheless rotate sufficiently quickly. The drive motor is, for example, an electric motor.

The invention also relates to an assembly of a crop, such as a tree or plant, and a device for cultivating the crop. According to the invention, the device comprises a rotary body which is rotatable about an axis of rotation, and also at least one cutting member which is fastened to the rotary body in such a way that the cutting member, during the rotation of the rotary body, defines a substantially circular path in an orbital plane, wherein the crop is positioned during operation radially within the path and partially through the orbital plane, and the device is configured for the chopping of said crop by the cutting member.

The device is configured, for example, as described in any one of Claims 1 to 13. In order to achieve the spherical shape of the crop, the crop to be cultivated and the rotary body can be movable in relation to each other about a rotary axis or swivel axis extending at an angle in relation to the axis of rotation of the cutting members. For example, the device is provided with a turntable for receiving the crop to be cultivated, the turntable being rotatable about a rotary axis extending at an angle in relation to the axis of rotation of the cutting members. The crop can also be fixed, for example in the soil, whereas the rotary body can be swivelled about a swivel axis extending at an angle in relation to the axis of rotation of the cutting members. The rotary axis of the turntable or the swivel axis of the rotary body extends, for example, substantially vertically.

According to the invention, the crop is preferably provided eccentrically within the circular path of the cutting members.

The rotary axis of the turntable or the swivel axis of the rotary body is then set apart from the axis of rotation of the rotary body. The circular path of the cutting members has a diameter which is greater than the diameter of the spherical shape, obtained after the cutting, of the crop. Along a cultivation portion of the circumference, said path and the spherical shape to be achieved lie against each other, so the crop is cultivated at this location by the cutting members. Outside, the cutting members are able to rotate about the spherical shape of the crop, thus allowing the cultivation to be performed locally and precisely.

The invention also relates to a method for cultivating a crop, such as a tree or plant, comprising:
  providing a crop,
  providing a device for cultivating the crop, comprising a rotary body which is rotatable about an axis of rotation, and also at least one cutting member which is fastened to the rotary body in such a way that the cutting member, during the rotation of the rotary body, defines a substantially circular path in an orbital plane,
  positioning the crop at least partially radially within the path of the cutting members and partially through the orbital plane,
  chopping the crop using the cutting member by rotating the rotary body.

It is possible that the rotary body is rotated at a rotational speed such that the cutting member chops through the crop without the use of a counter-blade. The speed with which the cutting member strikes a portion of the crop is sufficiently high for that portion to be chopped through. The tangential speed of the cutting member is, for example, greater than approximately 40 m/s, preferably greater than 50 m/s or 60 m/s.

The invention will now be described in greater detail with reference to an illustrative embodiment represented in the drawings, in which:

DETAILED DESCRIPTION OF THE INVENTION

Figure 1:
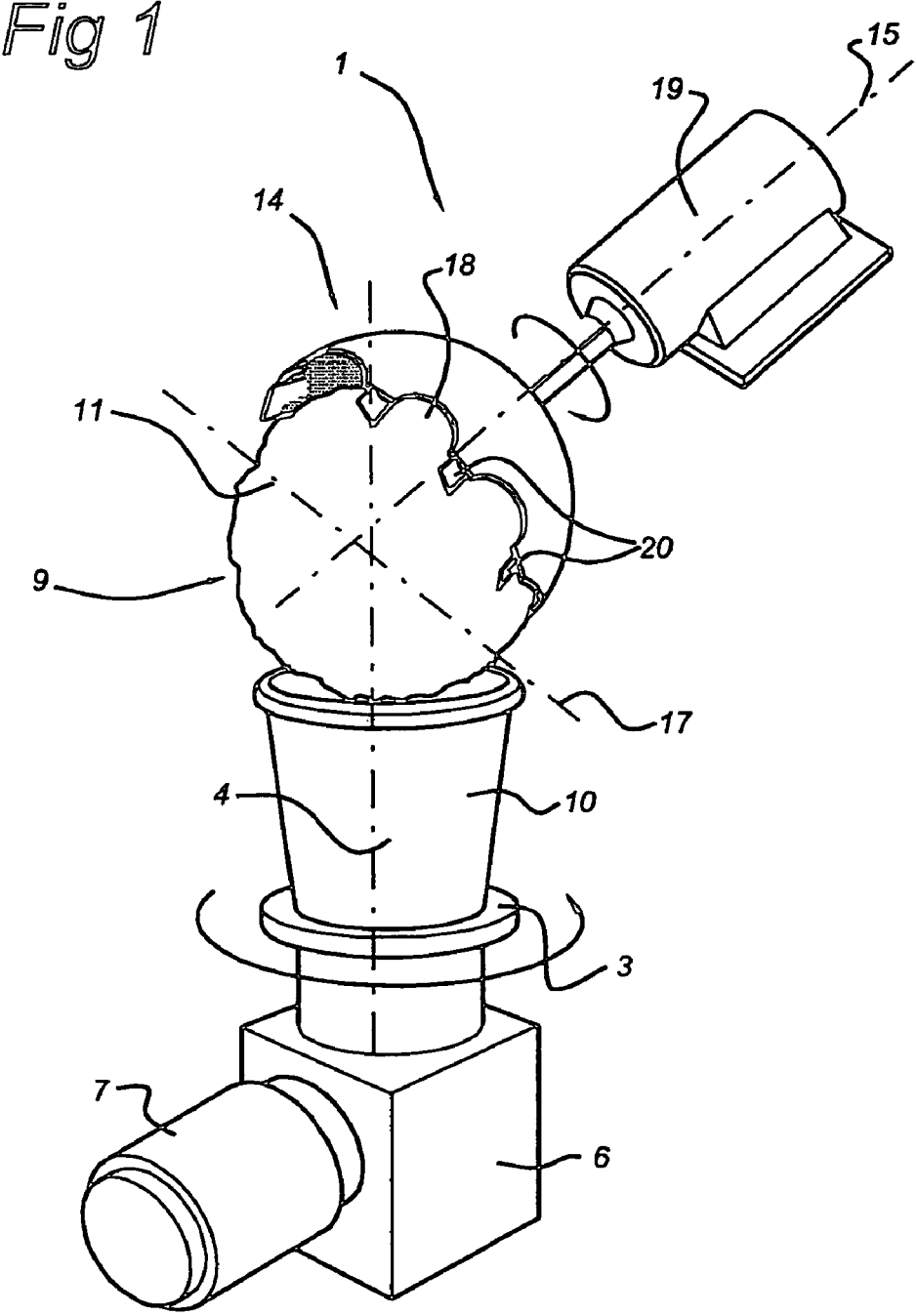
FIG. 1 is a perspective view of an assembly according to the invention comprising a crop and a device for cultivating the crop.

The assembly according to the invention comprises a crop and a device for cultivating the crop. The device for cultivating the crop is denoted in its entirety by reference numeral 1. In this illustrative embodiment, this device 1 comprises a turntable 3 which is attached to a base 6 so as to be able to rotate about a rotary axis 4. The rotary axis 4 extends substantially vertically. A motor 7 is able to turn the turntable 3 at a rotational speed of, for example, 300 revolutions per minute.

A crop, in this illustrative embodiment a box tree 9 with a ball of soil 10 and a crown 11, is received on the turntable 3. The ball of soil 10 can be received in a pot. In this case, the crown 11 is intended to have a taut and smooth spherical shape. In this illustrative embodiment, the spherical shape has a diameter of approximately 30 to 40 cm. A rotary body comprising cutting members or cutter blades 20 is provided to cut off twigs and leaves protruding from the spherical shape of the crown 11.

The device 1 for cultivating the crop comprises a rotary body 14. The rotary body 14 has a holder 30 which can be configured in various ways. The holder 30 is, for example, a frame or a cylindrical cup (not shown). In this illustrative embodiment, the holder 30 has approximately the shape of a hemisphere. At the open end of the holder 30 there is a circumferential edge 31. A number of cutting members 20 are attached, set apart from one another, to the circumferential edge 31 of the rotary body 14. The rotary body 14, with the cutting members 20 fastened thereto, is rotatable about an axis of rotation 15. The axis of rotation 15 extends at an angle in relation to the vertical.

The device 1 comprises a drive motor 19, such as an electric motor, which is able to rotate the rotary body 14 at a rotational speed such that the tangential speed of the cutting members 20 is between 50 and 60 m/s or greater. The rotational speed is dependent on the diameter of the rotary body 14. As the rotary body 14 revolves, the cutting members 20 pass through a substantially circular circumferential path extending in an orbital plane. The crown 11 of the box tree 9 is partially inserted into the holder 30 of the rotary body 14 through the orbital plane. The cutting members 20 are configured to chop off the portions of the crown 11 that are located outside the circular path.

Pruned-off twigs and/or leaves can in this case enter the holder 30 and be cast radially outward under the influence of centrifugal forces. The holder 30 therefore has recesses 18 which allow these twigs and/or leaves to pass through. The recesses 18 are optional.

The drive motor 19 and the rotary body 14 connected thereto are able to tilt as one unit about a tilt axis 17 extending substantially perpendicularly in relation to the vertical rotary axis 4 and axis of rotation 15. For this purpose, there is provided, for example, above the box tree 9 and the drive motor 19 a guide rail wherein the end of the drive motor 19 that is remote from the box tree 9 is able to move (not represented).

Figure 2:
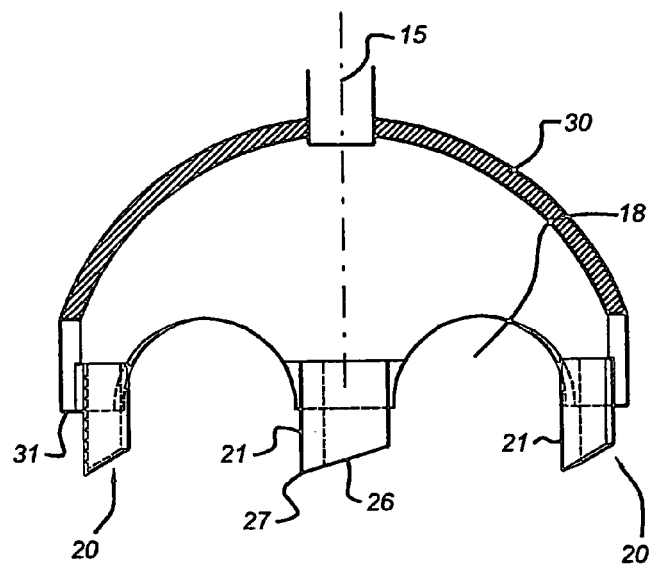
FIG. 2 is a side view in cross section of the rotary body of the device shown in FIG. 1.
Figure 3:
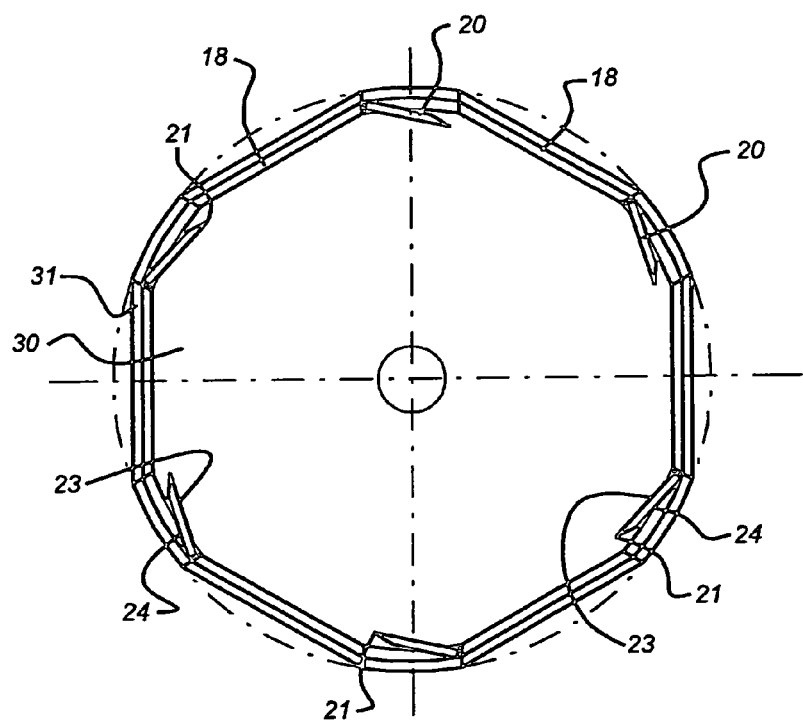
FIG. 3 is a view from below of the rotary body shown in FIG. 2.

The rotary body 14 and the cutting members 20 according to the invention are shown separately in FIGS. 2 and 3. Each cutting member 20 comprises a front cutting edge 21, a radial inner surface 23 and a radial outer surface 24. These surfaces 23, 24 intersect to form the cutting edge 21. The radial inner surface 23 and the radial outer surface 24 each extend radially somewhat inward toward the cutting edge 21. The surfaces 23, 24 are each located at an angle in relation to the tangential of the circular path of the cutting members 20.

Each cutting member 20 also has an end edge 26 on its side facing the box tree 9. The end edge 26 and the front cutting edge 21 merge in a pointing 27 as a result of the fact that the end edge 26 is provided at an angle in relation to the orbital plane of the circular path. The cutting member 20, which is represented in detail in FIGS. 2 and 3, is especially suitable for cultivating a crop positioned at least partially within the rotary body 14. Prior to cultivation, the crown 11 of the crop can be larger than the diameter of the cutter blades 20. By positioning said crown 11 to be cultivated within the revolving rotary body 14, the crown is sheared in the desired shape.

Figure 4:
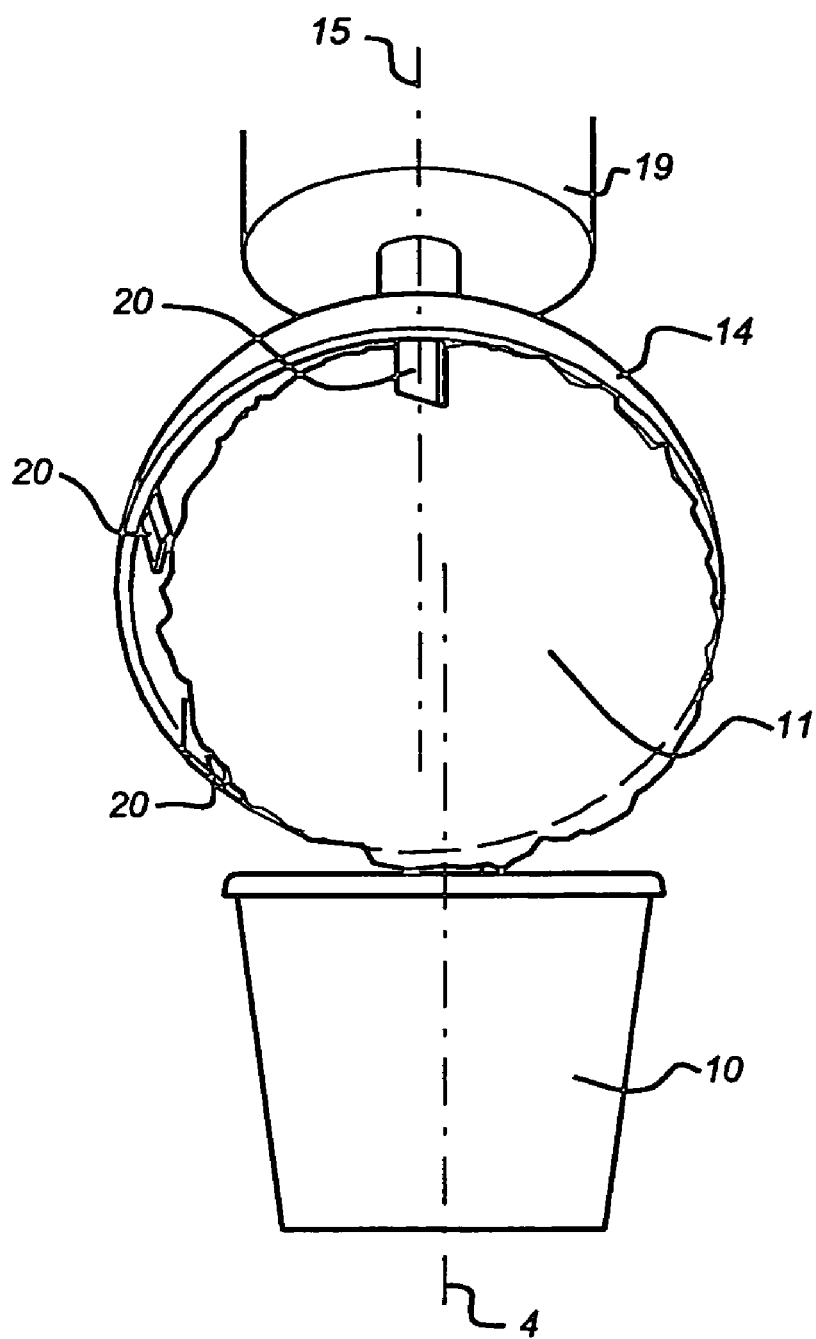
FIG. 4 is a front view of an assembly according to the invention comprising a crop and a device for cultivating the crop.

FIG. 4 shows that the spherical crown 11 of the crop 9 is provided eccentrically within the circumferential edge 31 of the rotary body 14. In this case, the cutting members 20 cut merely twigs and/or leaves protruding along a cultivation portion of the circumferential edge 31. Outside the cultivation portion, the cutting members 20 fastened to the circumferential edge 31 are able to rotate freely about the spherical shape of the crown 11.

The invention is not limited to the illustrative embodiment represented in the figures. A person skilled in the art may make various adaptations which are within the scope of the invention. For example, the crop can be fixedly erected, for example in the soil. In this case, the turntable is omitted. The rotary body and the drive motor connected thereto may, for example, swivel as one unit about a substantially vertical swivel axis. For this purpose, there is provided, for example, above the box tree and the drive motor a guide rail wherein the end of the drive motor that is remote from the box tree is able to swivel.

The invention claimed is:

1. A device for cultivating a crop, wherein the device comprises:
   a rotary body rotatable about an axis of rotation;
   at least one cutting member fastened to the rotary body such that the cutting member, during the rotation of the rotary body, defines a substantially circular path, and wherein the cutting member is configured such that a crop located radially within the path is chopped along said path by the cutting member,
   wherein the rotary body comprises a holder defining an internal volume for receiving the crop therein, the holder having at an open end thereof a circumferential edge, and wherein the at least one cutting member is attached to the circumferential edge; and
   a turntable for receiving the crop to be cultivated, wherein the turntable is rotatable about a rotary axis extending at an angle in relation to the axis of rotation of the rotary body.

2. The device according to claim 1, wherein the device is not provided with a fixed counter-blade cooperating with the cutting member.

3. The device according to claim 1, wherein the device is configured for rotating the rotary body at such a high speed that the crop is chopped through by the cutting member without the use of a counter-blade.

4. The device according to claim 1, wherein the device is configured for rotating the rotary body at a rotational speed such that the tangential speed of the cutting member is greater than approximately 40 m/s.

5. The device according to claim 1, wherein a plurality of cutting members are provided, each fastened to the rotary body such that each cutting member passes through the circular path during the rotation of the rotary body, and wherein the cutting members are set apart from one another.

6. The device according to claim 5, wherein each of the plurality of cutting members is provided with a cutting edge, a radial inner surface and a radial outer surface, wherein the surfaces intersect to form the cutting edge, and wherein at least one of said surfaces extends radially inward toward the cutting edge.

7. The device according to claim 6, wherein each of the plurality of cutting members is delimited in the axial direction of the rotary body by an end edge that is situated at such an angle in relation to the orbital plane through the circular path that the end edge and the cutting edge merge in a point.

8. The device according to claim 1, wherein the holder is provided with recesses formed from the circumferential edge between the cutting members.

9. The device according to claim 1, wherein the rotary axis of the turntable and the axis of rotation of the cutting members cross each other.

10. The device according to claim 1, wherein the rotary body is tillable about a tilt axis extending substantially perpendicularly in relation to the axis of rotation of the rotary body.

11. The device according to claim 1, further comprising a drive motor with a drive shaft, and wherein the rotary body is driven by a rotary shaft defining the axis of rotation thereof, and wherein the drive shaft of the motor is connected to the rotary shaft of the rotary body via a transmission, wherein the transmission increases the rotational speed of the rotary shaft of the rotary body in relation to the rotational speed of the drive shaft of the motor.

12. The device according to claim 1, wherein the crop is received on the turntable at a position that is eccentric with respect to the circumferential edge of the rotary body.

13. An assembly of a crop and a device for cultivating the crop, wherein the device comprises:
   a rotary body rotatable about an axis of rotation;
   at least one cutting member fastened to the rotary body such that the cutting member, during the rotation of the rotary body, defines a substantially circular path in an orbital plane, and wherein the crop is positioned radially within the path and partially through the orbital plane, and wherein the device is configured for the chopping of the crop by the cutting member,
   wherein the rotary body comprises a holder defining an internal volume, the holder having at an open end thereof a circumferential edge, wherein the at least one cutting member is attached to the circumferential edge, and wherein the crop is received within the internal volume of the holder; and
   a turntable for receiving the crop to be cultivated, wherein the turntable is rotatable about a rotary axis extending at an angle in relation to the axis of rotation of the rotary body.

14. The assembly according to claim 13, wherein the crop to be cultivated and the rotary body are movable in relation to each other about a rotary axis or swivel axis extending at an angle in relation to the axis of rotation of the cutting members.

15. The assembly according to claim 14, wherein the crop is provided eccentrically within the circular path of the cutting member or the cutting members.

16. The assembly according to claim 13, wherein the crop is received on the turntable at a position that is eccentric with respect to the circumferential edge of the rotary body.

17. A method for cultivating a crop comprising the steps of:
   a) providing a crop;
   b) providing a device for cultivating the crop, wherein the device comprises a rotary body rotatable about an axis of rotation, and also at least one cutting member fastened to the rotary body such that the cutting member, during the rotation of the rotary body, defines a substantially circular path in an orbital plane;
   c) positioning the crop at least partially radially within the path of the cutting member and partially through the orbital plane; and
   d) chopping the crop using the cutting member by rotating the rotary body,
   wherein the rotary body comprises a holder defining an internal volume, the holder having at an open end thereof a circumferential edge, wherein the at least one cutting member is attached to the circumferential edge, and wherein the step of positioning the crop includes positioning the crop within the internal volume of the holder, and wherein the crop to be cultivated is received on a turntable and the crop to be cultivated and the rotary body are moved in relation to each other about a rotary axis or swivel axis extending at an angle in relation to the axis of rotation of the cutting members.

18. The method according to claim 17, wherein the rotary body is rotated at a rotational speed such that the cutting member chops through the crop without the use of a counter-blade.

19. The method according to claim 17, wherein crop is positioned on the turntable eccentrically with respect to the circumferential edge of the rotary body.

* * * * *